D. J. JOHNSTON.
STEERING MECHANISM FOR MOTOR CYCLES.
APPLICATION FILED JAN. 29, 1913.

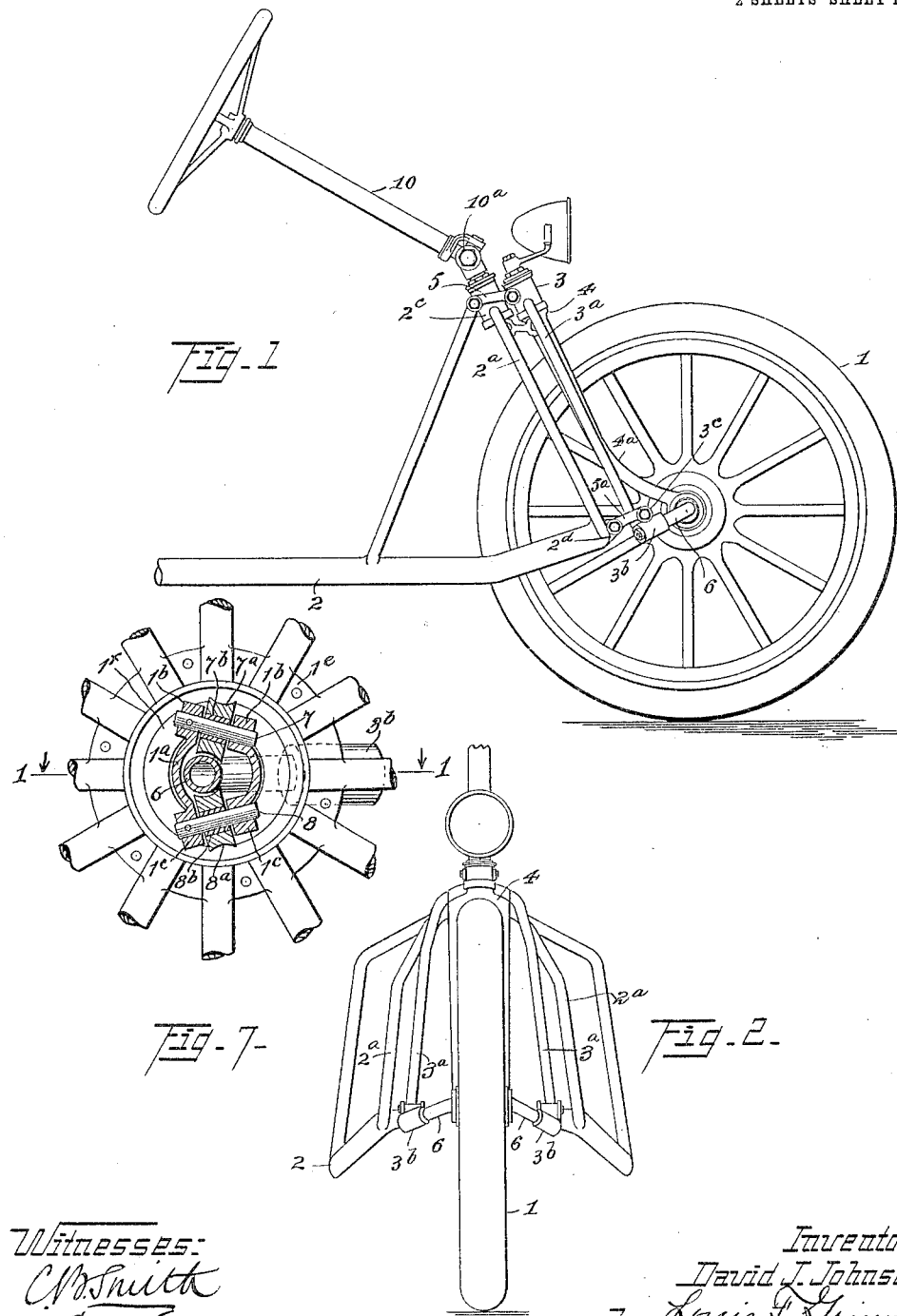

1,089,647.

Patented Mar. 10, 1914.
2 SHEETS—SHEET 2.

Witnesses:
C. B. Smith
L. G. Hopper

Inventor
David J. Johnston
by Louis F. Griswold
his Attorney

COLUMBIA PLANOGRAPH CO., WASHINGTON, D. C.

UNITED STATES PATENT OFFICE.

DAVID JAMES JOHNSTON, OF TORONTO, ONTARIO, CANADA, ASSIGNOR TO THE MILITAIRE AUTO COMPANY INC., OF CLEVELAND, OHIO, A CORPORATION OF OHIO.

STEERING MECHANISM FOR MOTOR-CYCLES.

1,089,647. Specification of Letters Patent. Patented Mar. 10, 1914.

Application filed January 29, 1913. Serial No. 744,854.

*To all whom it may concern:*

Be it known that I, DAVID JAMES JOHNSTON, a subject of Great Britain, residing at Toronto, in the Province of Ontario and Dominion of Canada, have invented a certain new and useful Improvement in Steering Mechanism for Motor-Cycles, of which the following is a specification.

My invention relates to the means employed for guiding or steering two-wheeled vehicles, and it applies particularly to that class of vehicles known as motor-cycles.

It has for its objects the providing of a simple and effective mechanism that relieves the strain on the steering head, by putting the pressure of the front wheel load on the frame, thereby lessening the friction and giving easy and perfect control to the rider. It also lessens to a great extent the liability of the wheel to skid when making an abrupt turn, by having the steering arc pass through the center of the guiding wheel and be supported entirely on the frame, thereby eliminating the tendency of the steering fork to spring or wabble, which under more or less severe conditions causes breakage of the said fork or connecting members. It will plainly be seen that these elements materially increase the durability of the machine and the safety and comfort of the rider.

With these objects in view I will now proceed to describe the invention, reference being made to the drawings in which—

Figure 3:
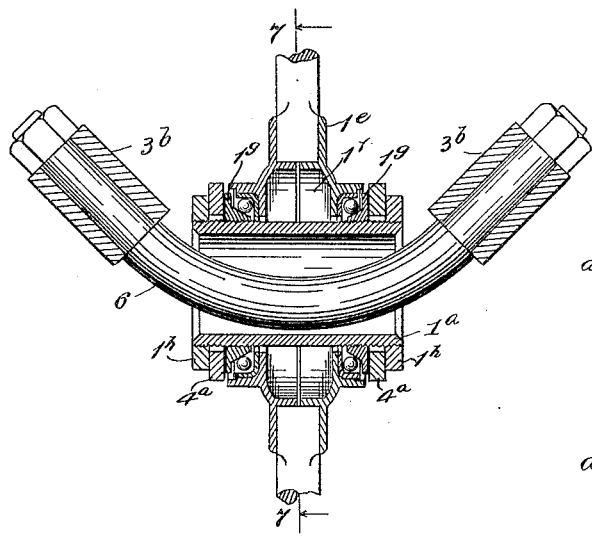
Figure 4:
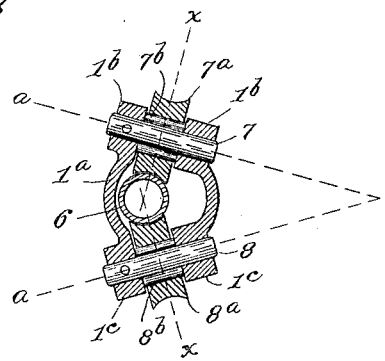
Figure 5:
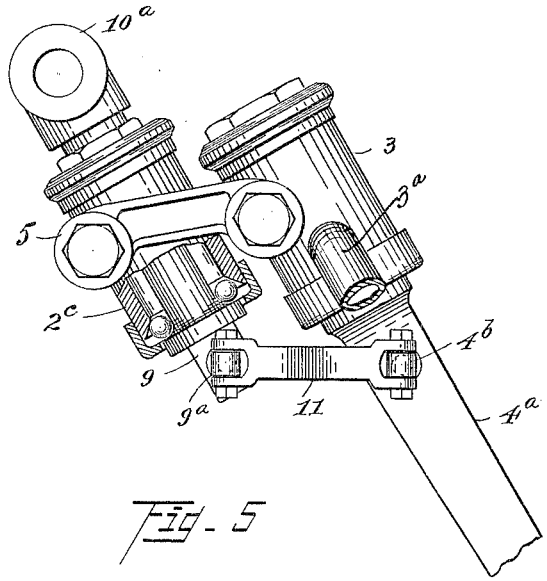
Figure 6:
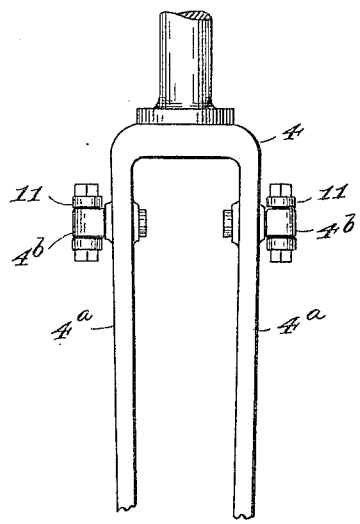

Figure 1 is a side elevation of the front portion of a motor-cycle embodying the improvement. Fig. 2 is a front view of the frame, forward wheel and steering fork. Fig. 3 is a horizontal section of the hub of front wheel on line 1—1 Fig. 7 showing the relative position of the steering arc. Fig. 4 is a vertical section of the barrel member of the hub, detached, showing bearing wheels and a cross-section of the steering arc. Fig. 5 is a fragmentary view of the steering head partially in section, and Fig. 6 is a view of a portion of the steering fork in front elevation. Fig. 7 is a vertical section through the middle of the wheel hub and arc track member on line 7—7, Fig. 3.

Similar characters of reference designate similar parts in the drawings and specification.

It is well known that the only practical way of steering vehicles of the class to which this invention applies, is through the medium of the front wheel, therefore the following description will be confined solely to the forward part of the machine, 1 being the front wheel and 2 the main frame. The fork members $2^a$ of the frame unite with a sleeve $2^c$. An auxiliary frame is attached to the main frame in the manner hereinafter described, and consists of the fork members $3^a$, which unite with a sleeve 3 at their upper terminals and are provided with sleeves $3^b$ at their lower extremities. This auxiliary frame forms a housing for the steering fork 4 which is journaled in the sleeve 3, its depending legs $4^a$, $4^a$ straddling the front wheel and connecting with the hub thereof.

The auxiliary frame has a flexible connection with the main frame through the medium of two pairs of links 5 and $5^a$, the upper pair 5 being attached to the sleeves $2^c$ and 3, and the lower pair $5^a$ attached to ears $3^c$ on the sleeves $3^b$ and to ears $2^d$ on the main frame. This flexible union of parts is provided as a shock relief.

An arc member 6 has its two terminals held rigid in the sleeves $3^b$, and passes through the barrel member $1^a$ in the hub of the wheel 1. The particular construction of the barrel member $1^a$, and the functions of the parts connected therewith forms an important factor in the efficiency of the invention. The barrel $1^a$ has lugs $1^b$, $1^b$ and $1^c$, $1^c$, protruding from its outward surface in the middle thereof; that is to say, in line with the middle line of the tread of the wheel. These lugs $1^b$ and $1^c$ are located at an angle, relative to the center of the barrel. The apex of the angle formed by imaginary lines $a$, $a$, Fig. 4, drawn through the centers of the lugs $1^b$, $1^b$, and $1^c$, $1^c$, is at the radial center of the arc of the member 6. The lugs $1^b$, $1^b$, and $1^c$, $1^c$, are adapted to carry trunnions 7 and 8. Mounted on these trunnions are bearing wheels $7^a$ and $8^a$, which are provided with suitable roller-bearings $7^b$ and $8^b$. The wheels $7^a$ and $8^a$ extend through slots in the barrel and are adapted to bear on the arc member 6. Imaginary lines $x$, $x$, drawn through the middle of the bearing faces of the wheels $7^a$ and $8^a$, and at right angles to the lines $a$, $a$, will intersect at the center of the arc member 6, as shown in Fig. 4. The other members which go to make up the formation of the hub, may be of any ball bearing construction suitable to the above described barrel member.

In the construction illustrated in the drawings, the hub-member proper $1^e$, is provided with an annular chamber $1^f$, and is adapted to revolve on the barrel member $1^a$, there being roller bearings between the member $1^e$ and the thrust collars $1^g$. The said thrust collars are threaded onto the barrel member $1^a$, the ends of the steering fork $4^a$ being clamped between the thrust collars $1^g$ and the retaining nuts $1^h$. It will be understood that the fork $4^a$ holds the barrel $1^a$ stationary, and that the chamber $1^f$ furnishes clearance for the lugs $1^b$ and $1^c$, and the protruding segments of the rollers $7^a$ and $8^a$.

The steering post 9 is journaled in the sleeve $2^c$, and is connected to the steering rod 10, by a universal joint $10^a$. Links 11, 11, connect the steering post 9 with the fork 4, and have swivel joints $9^a$ on the steering post, and similar joints $4^c$ on the fork. These swivel connections act in unison with the links 5 and $5^a$.

By the arrangement, connections and coaction of the various members as above described, it will readily be seen that the turning of the front wheel at an angle, for the purpose of guiding the vehicle is easily accomplished, with very little strain on the head members, as the hub of the wheel is supported by, and travels on the arc member 6 which is a part of the frame. The angular position of the roller bearings within the hub, relative to the track on which they travel insures perfect control, prevents chattering and transmits the major part of the strain to the lower portion of the frame, thereby reducing to a minimum the liability of the wheel to skid and lessening the chances of fracturing the steering fork, by providing an upper and lower bearing support.

What I claim and desire to secure by Letters Patent is—

1. In mechanism for the purpose described, the forward wheel mounted on a curved track and adapted to travel laterally in the arc of said track, in combination with the main frame, a track supporting frame, a steering fork connected with the hub of the wheel and journaled in the track supporting frame, a steering post journaled in the main frame, and connecting means between said post and the fork, whereby the lateral movement is imparted to the wheel.

2. In mechanism for the purpose described, the combination of the main frame, the forward wheel, a curved track member passing through the hub of the wheel, rollers mounted in the hub and bearing on the track member, a track supporting frame a steering fork connected with the hub and journaled in the track supporting frame, a steering post journaled in the main frame, flexible connection between said post and the fork, and flexible connection between the track supporting frame and the main frame.

3. In mechanism for the purpose described, the combination of the main frame, the forward wheel, a curved track member passing through the hub of the wheel and supported by a frame connected with the main frame, rollers mounted in the hub and bearing on the track member at an angle formed by lines drawn at right angles to the axes of the rollers and passing through the points of contact between said rollers and track, interesting at the center of the arc, a steering fork, and means for turning said fork, whereby the wheel is caused to travel in the arc of the track.

DAVID JAMES JOHNSTON.

Witnesses:
 FRED C. SCHLATTER,
 L. F. GRISWOLD.

---

Copies of this patent may be obtained for five cents each, by addressing the "Commissioner of Patents Washington, D. C."